US010036799B2

(12) United States Patent
Avitan et al.

(10) Patent No.: US 10,036,799 B2
(45) Date of Patent: Jul. 31, 2018

(54) DEVICE SYSTEM AND METHOD FOR DETERMINING THE RELATIVE ORIENTATION BETWEEN TWO DIFFERENT LOCATIONS

(71) Applicant: ELBIT SYSTEMS LTD., Haifa (IL)

(72) Inventors: Lior Avitan, Haifa (IL); Mark Gandelsman, Haifa (IL); Eugene Gurovich, Haifa (IL); Yoav Ophir, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 15/561,473

(22) PCT Filed: Mar. 17, 2016

(86) PCT No.: PCT/IL2016/050292
§ 371 (c)(1),
(2) Date: Sep. 25, 2017

(87) PCT Pub. No.: WO2016/151575
PCT Pub. Date: Sep. 29, 2016

(65) Prior Publication Data
US 2018/0059212 A1    Mar. 1, 2018

(30) Foreign Application Priority Data
Mar. 26, 2015 (IL) .......................................... 237971

(51) Int. Cl.
*G01S 5/16* (2006.01)
*G01P 21/00* (2006.01)
(Continued)

(52) U.S. Cl.
CPC .............. *G01S 5/163* (2013.01); *F41G 3/323* (2013.01); *G01B 11/272* (2013.01); *G01C 25/005* (2013.01); *G01P 21/00* (2013.01)

(58) Field of Classification Search
None
See application file for complete search history.

(56) References Cited

U.S. PATENT DOCUMENTS 3,731,543 A     5/1973  Gates
5,476,239 A  * 12/1995  Brainard ................ B64G 1/281
                                                           244/165
(Continued)

FOREIGN PATENT DOCUMENTS

EP    0557591 A1    11/1992
EP    2037205 A1     3/2009
EP    2602581 A1     6/2013

OTHER PUBLICATIONS

International Search Report and Written Opinion dated Jul. 11, 2016 for International Application No. PCT/IL2016/050292, 9 pages.

*Primary Examiner* — John Kuan
(74) *Attorney, Agent, or Firm* — Knobbe, Martens, Olson & Bear, LLP

(57) ABSTRACT

A device for determining relative orientation between two locations including an imager, an inertial-orientation-sensor firmly attached to the imager for determining information relating to the orientation thereof and which exhibits drift and a processor coupled with the imager and with the inertial-orientation-sensor. The processor determines a first orientation-measurement and first time-tag when the device is oriented with a first-orientation-indicator located at a first location. The processor determines a second-orientation-measurement and second time-tag when the device is oriented with a second-orientation-indicator located at a second location. The processor determines a third-orientation-measurement and third time-tag when the device is oriented again with the first-orientation-indicator. The processor determines the drift associated the inertial-orientation-sensor according to difference between the first-orientation- (Continued)

measurement and the third-orientation-measurement the respective time-tags associated therewith. The processor determines an angle-difference between the first-orientation-indicator and the second-orientation-indicator according to the first-orientation-measurement and the second-orientation-measurement, the first and second time-tags and the drift.

19 Claims, 11 Drawing Sheets

(51) Int. Cl.
*G01C 25/00* (2006.01)
*F41G 3/32* (2006.01)
*G01B 11/27* (2006.01)

(56) References Cited

U.S. PATENT DOCUMENTS

| | | | |
|---|---|---|---|
| 5,619,323 | A | 4/1997 | Hamilton et al. |
| 6,786,877 | B2 | 9/2004 | Foxlin |
| 7,742,176 | B2 | 6/2010 | Braunecker et al. |
| 8,332,181 | B1 * | 12/2012 | Liu ................ G01C 25/005 345/156 |
| 8,977,512 | B1 * | 3/2015 | Cote ................ G01C 25/005 702/92 |
| 2009/0119937 | A1 | 5/2009 | Watson |
| 2009/0287451 | A1 | 11/2009 | Sato et al. |
| 2010/0332181 | A1 | 12/2010 | Jones et al. |
| 2012/0176492 | A1 * | 7/2012 | Garin ................ H04N 7/18 348/116 |
| 2015/0025801 | A1 * | 1/2015 | Linton ................ G01C 19/04 701/530 |
| 2015/0033567 | A1 | 2/2015 | Jones et al. |

* cited by examiner

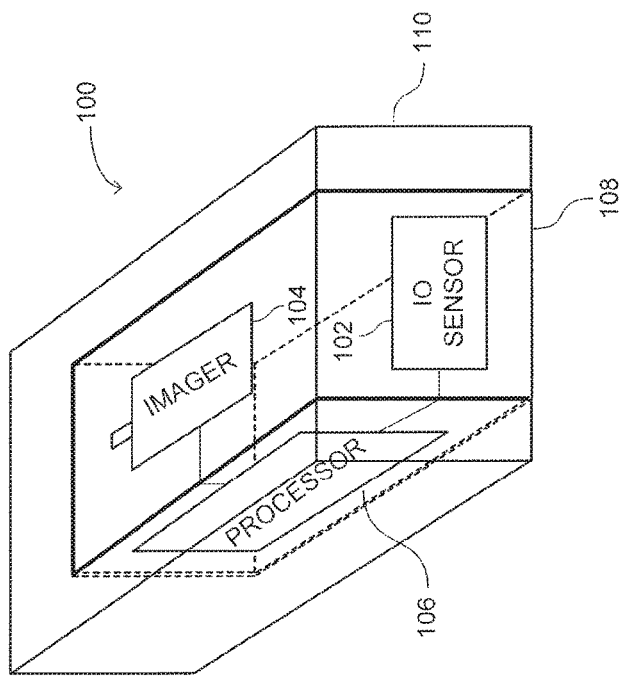
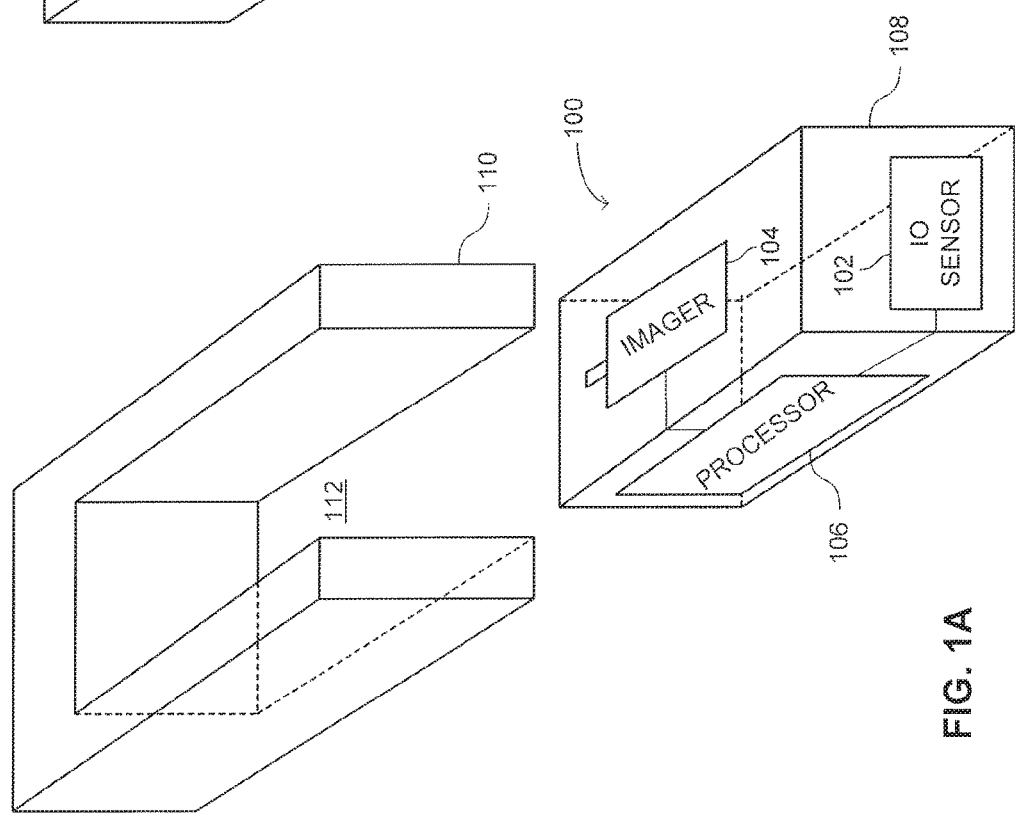
FIG. 1B
FIG. 1A

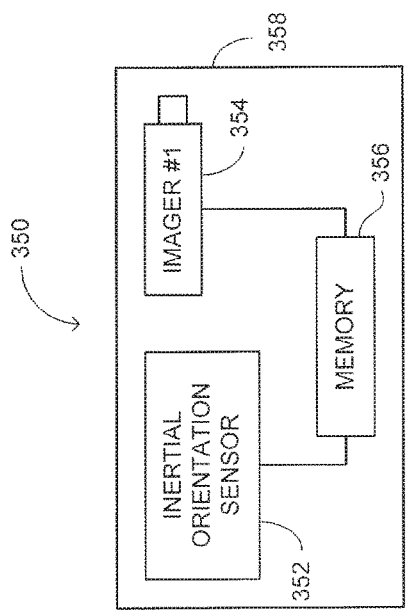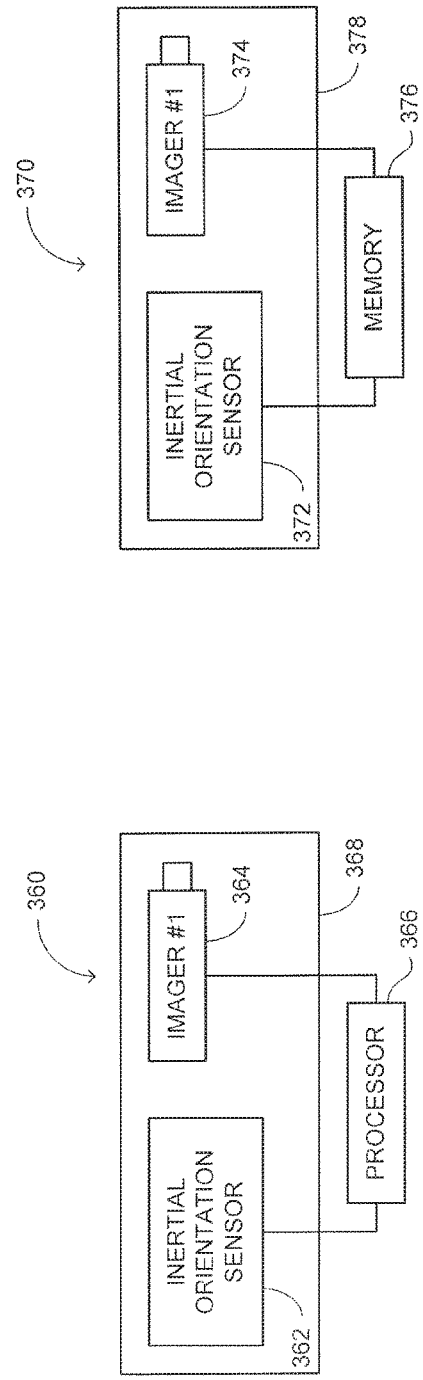

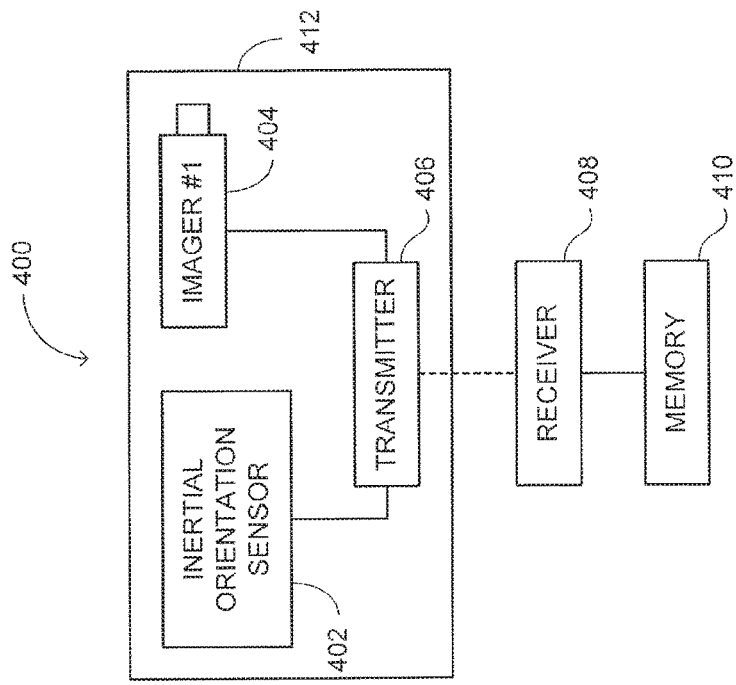
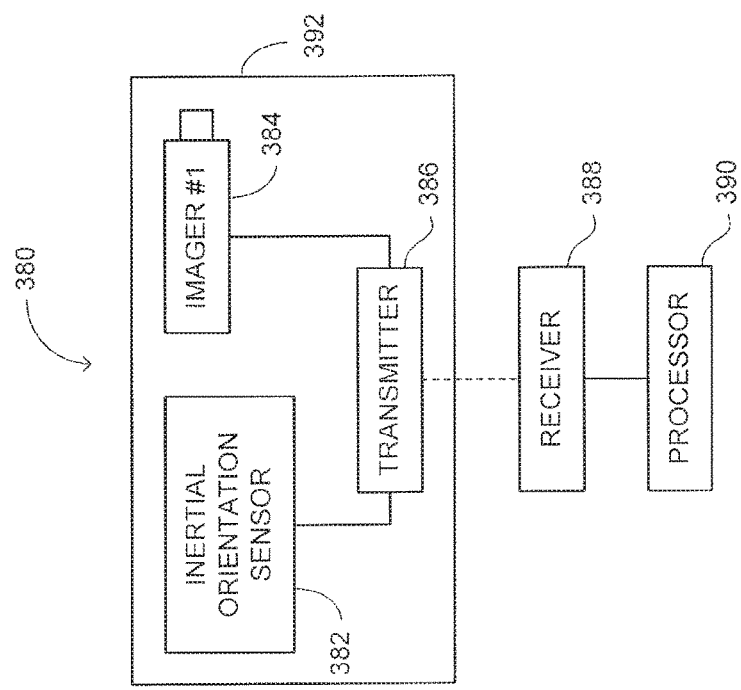

DEVICE SYSTEM AND METHOD FOR DETERMINING THE RELATIVE ORIENTATION BETWEEN TWO DIFFERENT LOCATIONS

FIELD OF THE DISCLOSED TECHNIQUE

The disclosed technique relates to registration in general, and to methods and systems for determining the relative orientation between two different locations in particular.

BACKGROUND OF THE DISCLOSED TECHNIQUE

Boresighting is generally employed to align various systems to a frame of reference of a vehicle (e.g., an aircraft, a tank, a ship). Such systems may be armament systems (e.g., guns, missiles mounting devices), guidance systems such as radar or tracking systems such as operator head tracking systems. Boresighting such systems to the frame of reference of the vehicle is required for such systems to operate properly. More generally, boresighting relates to determining the relative orientation between two different locations.

U.S. Pat. No. 5,619,323 to Hamilton et al, entitled "Gyroscopic System for Boresighting Equipment by Transferring a Frame of Referenced" directs to system and a method for aligning the frame of reference of various equipment, such as sensors, guns camera and antennae located on an aircraft, with the reference axis of the aircraft. The system directed to by Hamilton et al includes a first stationary inertial sensor that is boresighted with respect to a reference line of the aircraft. This first inertial sensor includes a first gyroscopic combination for generating a first output indicating a frame of reference (i.e., either 2D or 3D) based on the reference line and a docking station. The docking station facilitates alignment of a second portable inertial sensor which also includes a gyroscopic combination for generating a second output indicating the frame of reference thereof.

One of the methods directed to by Hamilton et al includes boresighting the first stationary inertial sensor with respect to the reference line of the aircraft and positioning the second portable inertial sensor on the docking station of the first inertial sensor for aligning the two inertial sensors. Then the outputs from respective first inertial sensor and from the second inertial sensor are processed to determine the difference between the respective frames of reference thereof. The second portable inertial sensor is then aligned with respect to a device to be boresighted. The outputs respective of the first inertial sensor and the second inertial sensor are then processed to determine a third frame of reference of the second portable inertial sensor relative to the first stationary inertial sensor. The difference between the first, second and third frames of reference is calculated to align the device with respect to the reference line.

To increase the accuracy of the boresighting the first inertial unit may be provided with a mirror having first and second nonplanar surfaces and the second inertial unit is provided with a gimbal and gimbal drive system, a laser beam generator for projecting a laser beam and a collimator for indicating an angle between two beams. With such a system, the method includes the steps of positioning a laser beam from the beam generator of the second portable inertial sensor to the mirror mounted on the first stationary inertial sensor, form which the beam is reflected. Then the angle between the projected beam and the reflected beam is measured with the collimator of the second inertial unit. The first, second and third outputs from the respective first inertial unit, second inertial unit and collimator are processed to determine a first frame of reference of the second portable inertial sensor relative to the first stationary inertial sensor. The portable second inertial sensor is then aligned with respect to the device to be boresighted. The first, second and third outputs from the respective first inertial unit, second inertial unit and collimator are again processed to determine a second frame of reference of the second portable inertial sensor relative to the first stationary inertial sensor. Then, difference between the first frame of reference and the second frame of reference is calculated to determine the alignment of the device with respect to the reference line.

European patent application publication EP 2 602 581 to Jones et al, entitled "Field Interchangable Boresight Mounting System and Calibration Method" directs to a system for calibrating a tray on which a boresighting device is to be mounted. The system directed to by Jones et al includes amounting system, which further includes a frame alignment measurement sensor and a frame movement sensor. The alignment measurement sensor is affixed to the device to be boresighted and optionally affixed to an adapter. The frame movement sensor is affixed directly to mounting tray. The movement sensor measures the attitude changes of the mounting tray. According to Jones at el, the measurement sensor is placed in a first position and orientation and the angular position of the tray is measured. Then the measurement sensor is moved to a second position and orientation and the angular position of the tray is measured. The As long as the mounting tray remains in the same position, the static offset errors of the boresighting device and the adapter, as well as misalignment errors of the mounting tray, will be observed by the relative changes in pitch and roll, from the starting first position to the second position. The alignment measurement sensor is then moved back to the first position and the angle of the angular position of the tray is measured again. This repeated measurement enables the system directed to by Jones et al to determine whether a current position of the alignment measurement sensor is within repeatability bounds.

U.S. Patent Application Publication 2010/0332181 to Jones et al, entitled "System and Method for Determining Angular Differences on a Potentially Moving Object" directs to a boresight alignment system which includes two independent navigating inertial reference units (IRUs) mounted on a flight vehicle. A first IRU measures the angular difference between two points on an aircraft. The second IRU measures any angular changes that may take place on the aircraft. Thus the chassis of the aircraft may be in motion while the alignment procedure is being performed. Moreover, the aircraft can be located on a moving platform such as an aircraft carrier.

In operation, the system directed to by Jones et al records angular information relating to frame of reference of the alignment sensor and the movement sensor at a first boresight position at a first point in time. The alignment sensor is relocated to a second boresight position on the object at a second point in time. Then the frame of reference angular information of the alignment sensor and the movement sensor at this second position is recorded at a second point in time. The system directed to by Jones et al employs these four sets of data to determine the alignment of the first boresight position to the second boresight position. Moreover, the system directed to by Jones et al selectively measure these two sets of data at a point in time where motion is at or below a prescribed limit based on a selected measurement accuracy level. The differences between the first position and the second position is then determine. The movement sensor (the second IRU) is attached to the object and configured to detect any angular movement of the object between recording of the first, the second, and any subsequent measurements. For example, any rotation of the object is detected by the movement sensor and is used during boresight alignments or subsequent boresight realignments to correct the difference measurement for the amount of angular movement that has occurred on the object.

SUMMARY OF THE PRESENT DISCLOSED TECHNIQUE

It is an object of the disclosed technique to provide a novel device and method and system for determining relative orientation between two different locations.

In accordance with the disclosed technique, there is thus provided a device for determining relative orientation between two different locations. The device includes, an imager, an inertial orientation sensor, and a processor. The processor is coupled with the imager and with the inertial orientation sensor. The inertial orientation sensor is firmly attached to the imager and determines information relating to the orientation thereof. The inertial orientation sensor exhibits drift. The processor determines a first orientation measurement of the device when the device is oriented with a first orientation indicator and determines a first time-tag associated with the first orientation measurement. The first orientation indicator is located at a first location. The processor determines a second orientation measurement of the device when the device is oriented with a second orientation indicator and determines a second time-tag associated with the second orientation measurement. The second orientation indicator is located at a second location. The processor determines a third orientation measurement of the device when the device is oriented again with the first orientation indicator and determines a third time-tag associated with said third orientation measurement. The processor determines the drift associated the inertial orientation sensor according to difference between the first orientation measurement and the third orientation measurement the respective time-tags associated with the first and third orientation measurements. The processor determines an angle difference between the first orientation indicator and the second orientation indicator according to the first orientation measurement and the second orientation measurement, the first and second time-tags and the drift.

In accordance with another aspect of the disclosed technique, there is thus provided a method for determining the relative orientation between two locations. The method includes the procedures of orienting an orientation alignment device with a first orientation indicator, said first orientation indicator being located at a first location, determining a first orientation measurement of said orientation alignment device and determining a time-tag associated with said first orientation measurement, orienting said orientation alignment device with a second orientation indicator, said second orientation indicator being located at a second location and determining a second orientation measurement of said orientation alignment device and determining a second respective time-tag associated with said second orientation measurement. The method further includes the procedures of orienting said orientation alignment device with said first orientation indicator again, determining a third orientation measurement of said orientation alignment device and determining a third time-tag associated with said third orientation measurement and determining the drift associated the inertial orientation sensor according to difference between said third orientation measurement and said first orientation measurement and the respective third and first time-tags associated therewith. The method also includes the procedure of determining the angular difference between the first location and the second location according to said first orientation measurement, said second orientation measurement said first and second time-tags and said drift.

BRIEF DESCRIPTION OF THE DRAWINGS

The disclosed technique will be understood and appreciated more fully from the following detailed description taken in conjunction with the drawings in which:

FIGS. 1A and 1B are schematic illustrations of an orientation alignment device and the use thereof with a mechanical orientation indicator in accordance with an embodiment of the disclosed technique;

FIGS. 7A-7E are schematic illustrations of various configurations of an orientation alignment device in accordance with the disclosed technique.

DETAILED DESCRIPTION OF THE EMBODIMENTS

Figures 2A, 2B:
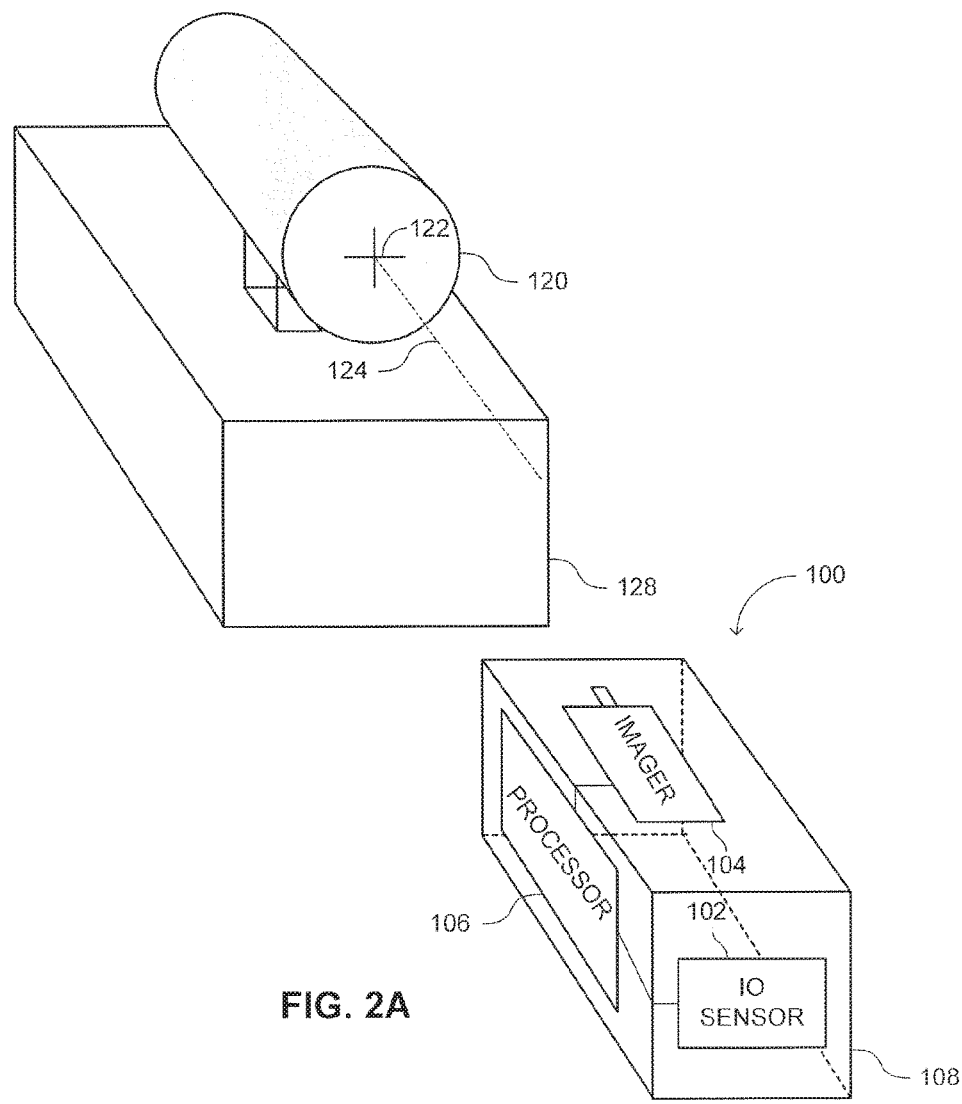
FIGS. 2A-2D are schematic illustrations of an orientation alignment device and the use thereof with a BRU orientation indicator in accordance with another embodiment of the disclosed technique.

The disclosed technique overcomes the disadvantages of the prior art by providing an orientation alignment device and method for determining the relative orientation between two different coordinate systems each associated with a respective different location. The term "orientation alignment device" and the term "device" are used herein interchangeably. To that end an inertial orientation sensor is firmly attached to an imager and determines information relating to the orientation thereof. This inertial orientation sensor may exhibit drift (i.e., a change in the measurement readings over time). A processor, coupled with the imager and with the inertial orientation sensor, determines the orientation of the device according to the information relating to the orientation of the inertial orientation sensor. The processor further determines drift of the inertial orientation sensor. To determine the relative orientation between the two different locations with an inertial orientation sensor that exhibits drift, the device is oriented a first time with a first orientation indicator located at the first location. The processor determines a first orientation measurement of the orientation alignment device and time-tags this first orientation measurement. The term "oriented with" relates herein to positioning the orientation alignment device such that the device and the orientation indicator exhibit either a predetermined relative orientation or a determinable relative orientation therebetween. The device is then oriented with a second orientation indicator located at a second location. The processor determines a second orientation measurement of the device and time-tags this second orientation measurement. Thereafter, the device is oriented a second time with the first orientation indicator. The processor determines a third orientation measurement of the device and time-tags this third orientation measurement. The processor determines the drift associated the inertial orientation sensor according to the difference between the first orientation measurement and the third orientation measurement and the respective time-tags associated with the first and third orientation measurements. Then, the processor determines an angular difference between the first orientation indicator and the second orientation indicator according to the first orientation measurement and the second orientation measurement, the respective time-tags thereof and the determined drift. Consequently, the processor determines the relative orientation between the two different coordinate systems associated with the two respective different locations.

It is noted that, alternatively, the processor may estimate a first orientation when said device was oriented with the first orientation indicator and a second orientation (i.e., when the device was oriented with the second orientation indicator), according to the either the first and the second orientation measurements or the second and third orientation measurement, the respective time-tags thereof and the determined drift. The processor may then determine the relative orientation between the two different coordinate systems according to the first and second orientations estimations. However, this is equivalent to determining the relative orientation between the two different coordinate systems according to first orientation measurement, the second orientation measurement, the respective time-tags thereof and the determined drift.

Each of the above mention first orientation indicator or second orientation indicator is, for example, a slab to which the device is mechanically coupled at a predetermined relative orientation between the device and the slab. Alternatively, each of the first orientation indicator or second orientation indicator may be a Boresight Registration Unit (BRU). A BRU is a device which displays a collimated reticle (e.g., crosshairs) which is visible only when an observer exhibits a specific orientation and is located on the axis of the BRU. Thus, the orientation of the observer matches the orientation of the axis of the BRU. According to yet another alternative, each of the first orientation indicator or second orientation indicator is, for example, an array of light emitters (i.e., either light source or light reflectors), where the spatial relationship (i.e., the relative location) between these light emitters is known. The device can determine the orientation thereof according to an acquired image of the light emitters. Employing such orientation indicators is further elaborated below.

Figure 2C:
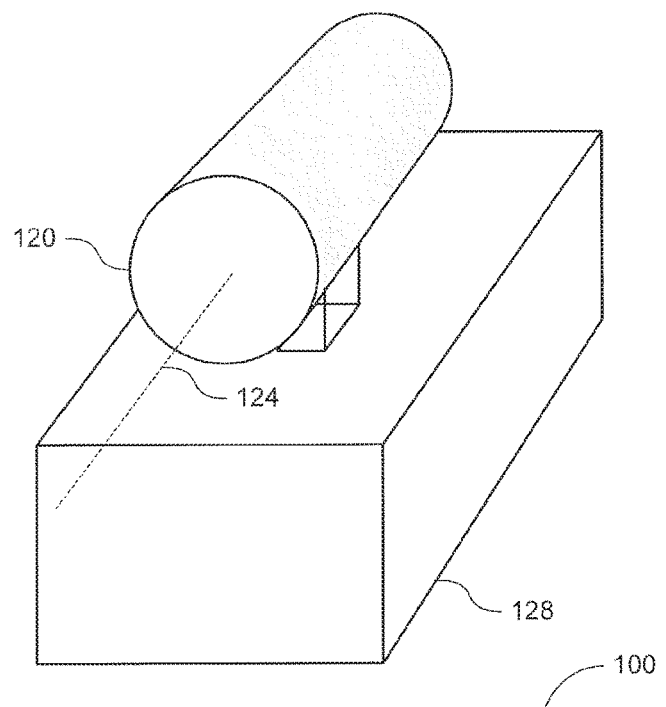
Figure 2C:
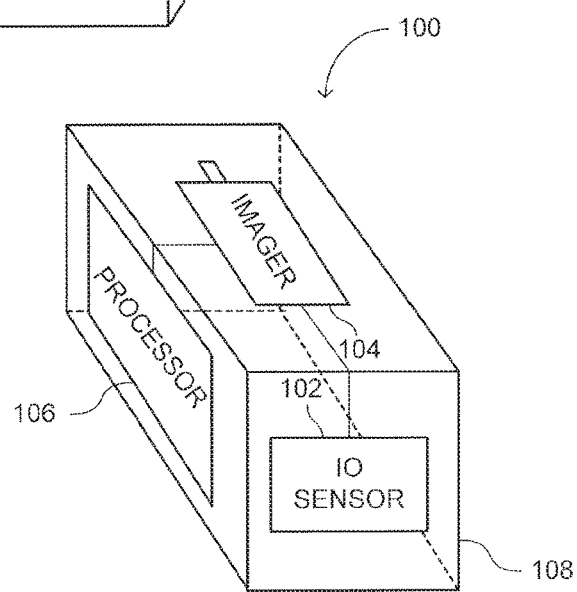
Figure 2D:
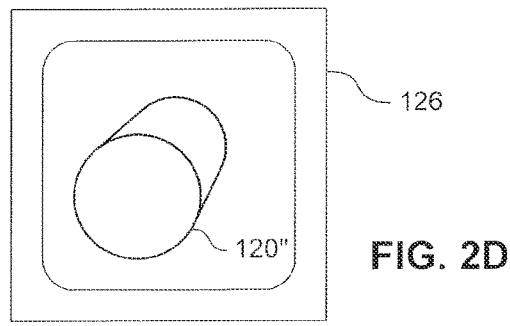
Figure 3:
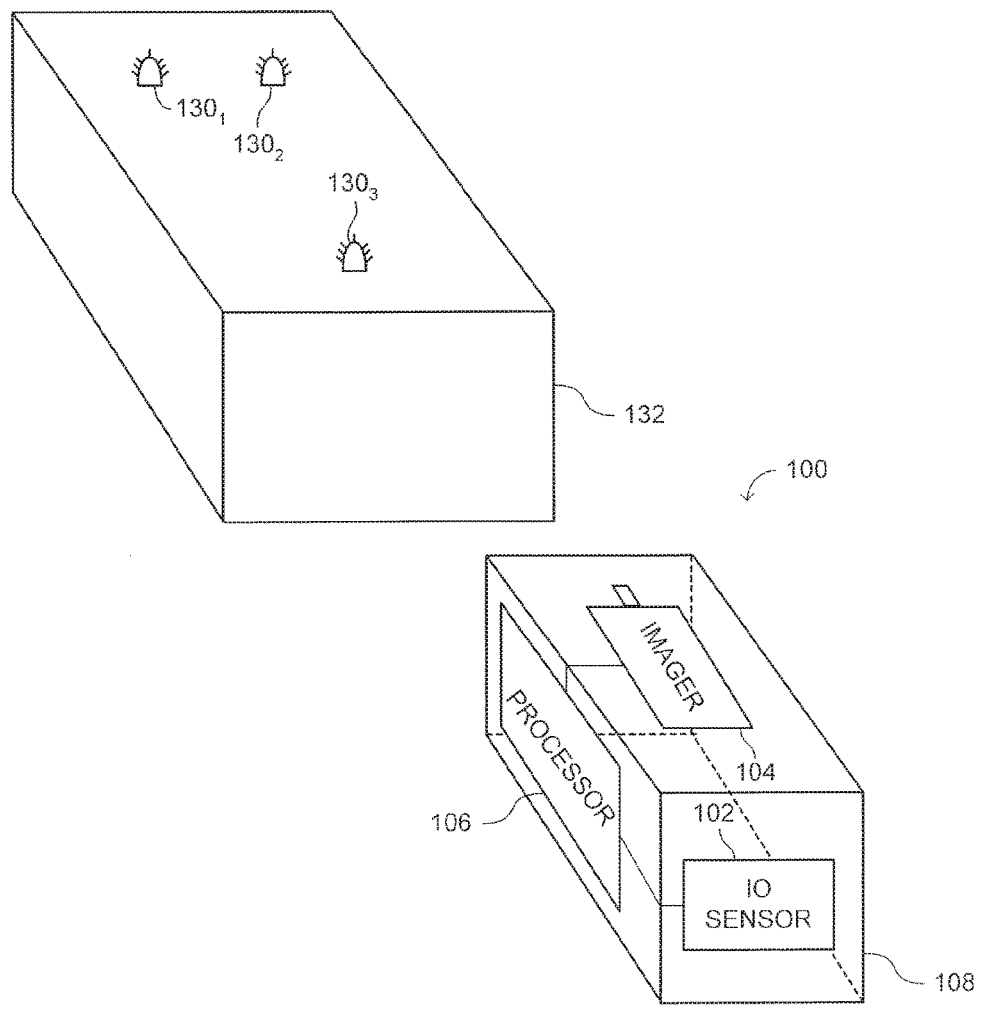
FIG. 3 is a schematic illustration of an orientation alignment device and the use thereof, where the orientation indicator is an array of light emitter attached to a slab, in accordance with a further embodiment of the disclosed technique.

Reference is now made to FIGS. 1A, 1B 2A-2D and 3, which are a schematic illustration an orientation alignment device, generally referenced 100, for determining the relative orientation between two locations, each associated with a respective coordinate system. FIGS. 1A and 1B depict device 100 and the use thereof with a mechanical orientation indicator 110. FIGS. 2A-2D depict device 100 and the use thereof with a BRU orientation indicator 120. FIG. 3 depicts device 100 and the use with an array of light emitters $130_1$, $130_2$ and $130_3$. Device 100 includes an inertial orientation sensor 102 (abbreviated IO sensor in FIGS. 1A, 1B 2A-2D and 3), an imager 104 and a processor 106. Processor 106 is coupled with inertial orientation sensor 102 and with imager 104. Inertial orientation sensor 102 and imager 104 are mechanically coupled therebetween, for example, via a rigid frame 108 such that inertial orientation sensor 102 and imager 104 maintain a fixed relative orientation therebetween. Inertial orientation sensor 102 is, for example, a gyroscope, such as a Microelectromechanical Systems (MEMS) gyroscope, a Fiber Optic Gyroscope (FOG), Hemispherical Resonator Gyroscope (HRG), a Coriolis Vibratory Gyroscope (CVG), a Dynamically Tuned Gyroscope (DTG) or a London Moment Gyroscope. Such a gyroscope measures the angular velocity of the device at three different orthogonal axes (i.e., either one sensor measures the angular velocity in the three axes or three different sensors each measure the angular velocity in a respective different axis). Inertial orientation sensor 102 provides orientation related information to processor 106. This orientation related information may be a measurement of the orientation of inertial orientation sensor 102 or measurement of the angular velocity of inertial orientation sensor 102 in each orientation axis. Processor 106 determines the orientation (e.g., Eulers angles $\varphi$, $\theta$, $\psi$ or Tait-Bryan angles also known as pitch, yaw and roll) of inertial orientation sensor 102, according to the orientation related information (i.e., either directly or by continuously integrating the output of inertial orientation sensor 102 over time).

Although in FIGS. 1A, 1B 2A-2D and 3, processor 108 is depicted as also being attached to rigid frame 108, that is not necessarily the case. In general, as further explained below in conjunction with FIGS. 7A-7E, processor 106 may be wirely or wirelessly coupled with the imager and the inertial orientation sensor and not attached to the rigid frame. Alternatively, the imager and the inertial orientation sensor may be wirely or wirelessly coupled with a memory which stores the readings thereof. These readings may then be downloaded to the processor for analysis.

With reference to FIGS. 1A and 1B and as mentioned above, these figures are schematic illustrations of orientation alignment device 100 and the use thereof with a mechanical orientation indicator 110 in accordance with an embodiment of the disclosed technique. Orientation alignment device 100 is configured to be attached to mechanical orientation indicator 110 such that the relative orientation between device 100 and mechanical orientation indicator 110 is substantially constant. In FIGS. 1A and 1B, mechanical orientation indicator 110 is depicted as a slab with a niche 112. In FIG. 1B, device 100 is oriented with mechanical orientation indicator 110. More specifically, orientation alignment device 100 is depicted within niche 112. For example, an operator may hold orientation alignment device 100 within niche 112 in mechanical orientation indicator 110. When orientation alignment device 100 is inserted into niche 112, the relative orientation between orientation alignment device 100 and mechanical orientation indicator 110 is substantially constant. Mechanical orientation indicator 110 may alternatively be any surface, located at one of the locations, to which orientation alignment device 100 may be temporarily or permanently attached, for example, with the aid of screws, pins, adhesives (e.g., two side adhesive strips), welding and the like, such that the orientation of device 100 relative to that surface does not change.

With reference to FIGS. 2A-2D and as mentioned above, these figures are schematic illustrations of orientation alignment device 100 and the use thereof with a BRU orientation indicator 120 in accordance with another embodiment of the disclosed technique. BRU 120 is a device which displays a collimated reticle 122, which is visible only when an observer or an imager exhibits a specific orientation and is located on the axis 124 of BRU 120. In FIG. 2A, orientation alignment device 100 oriented with BRU 120. Specifically, orientation alignment device 100 is positioned such that BRU 120 is within the Field Of View (FOV) of imager 104, imager 104 is located on axis 124 of BRU 120 and oriented such that the optical axis of imager 104 and the axis 124 of BRU 120 coincide. Consequently, imager 104, and thus orientation alignment device 100 exhibits a similar orientation to the orientation of axis 124, and thus of BRU 120, and reticle 122 is visible in images acquired by imager 104. FIG. 2B depicts an image acquired by imager 104 and displayed on a display 126. This image includes a reticle representation 122' of reticle 122 and a BRU representation 120' of BRU 120. In FIG. 2C, orientation alignment device 100 has moved such that, axis 124 of BRU 120 and the optical axis of imager 104 no longer coincide. In other words, either imager 104 is not located on axis 124 of BRU 120 or the orientation of imager 104 has changed such that BRU 120 is no longer within the field of view of imager 124, or both. FIG. 2D depicts an image acquired by imager 104 and displayed on a display 126. This image includes only a BRU representation 120" of BRU 120. In FIGS. 2A and 2C, BRU 120 is depicted as being attached to a slab 128. However, in general, BRU 120 may be temporarily or permanently attached to a surface at one of the locations, for example, with the aid of screws, adhesives (e.g., two side adhesive strips), welding and the like, such that the orientation of device 100 relative to that surface does not change.

With reference to FIG. 3 and as mentioned above, this figure is a schematic illustration of orientation alignment device 100 and the use thereof, where the orientation indicator is an array of light emitter $130_1$, $130_2$ and $130_3$ attached to a slab 132 in accordance with a further embodiment of the disclosed technique. The spatial relationship (i.e., the relative location and orientation) between light emitters $130_1$, $130_2$ and $130_3$ is known. In FIG. 3, device 100 is oriented with array of light emitters $130_1$, $130_2$ and $130_3$. Processor 106 determines the orientation of orientation alignment device 100 in a coordinate system associated with slab 132, according to at least one image of light emitters $130_1$, $130_2$ and $130_3$ acquired by imager 104. In general, to determine the location and orientation device 100 according to an image of light emitters $130_1$, $130_2$ and $130_3$, processor 106 generates and solves at least six equations with six unknowns (e.g., three unknowns for location, the x, y and z coordinates and three unknowns for orientation, the azimuth elevation and roll angles). Each representation of light emitters $130_1$, $130_2$ and $130_3$ in the image is associated with two angles. These angles, along with the known spatial relationship (i.e., relative location) between light emitters $130_1$, $130_2$ and $130_3$, define the above mentioned six equations with six unknowns.

Figure 4A:
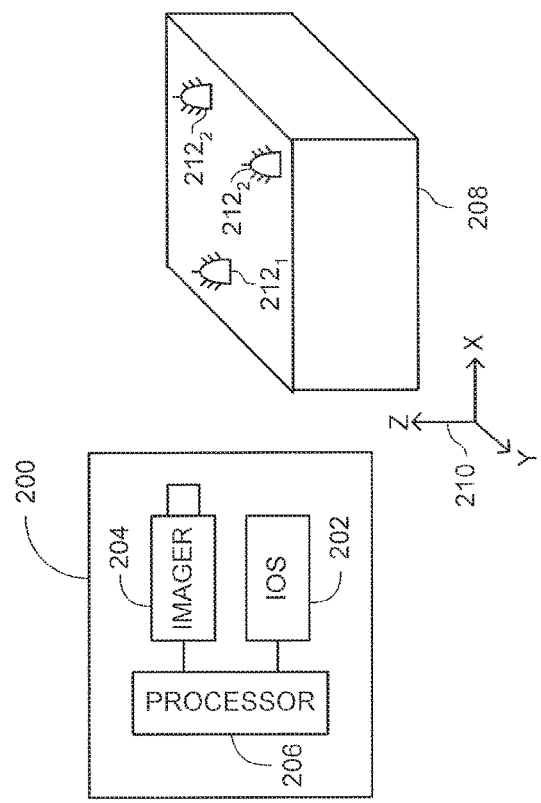
FIGS. 4A-4C are schematic illustrations of a process for determining the relative orientation between two different locations, employing an orientation alignment device, in accordance with another embodiment of the disclosed technique.
Figure 4A:
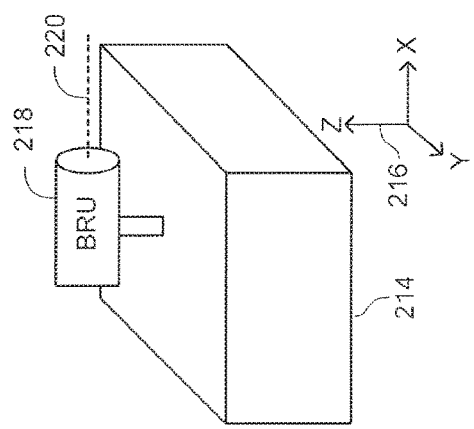
Figure 4B:
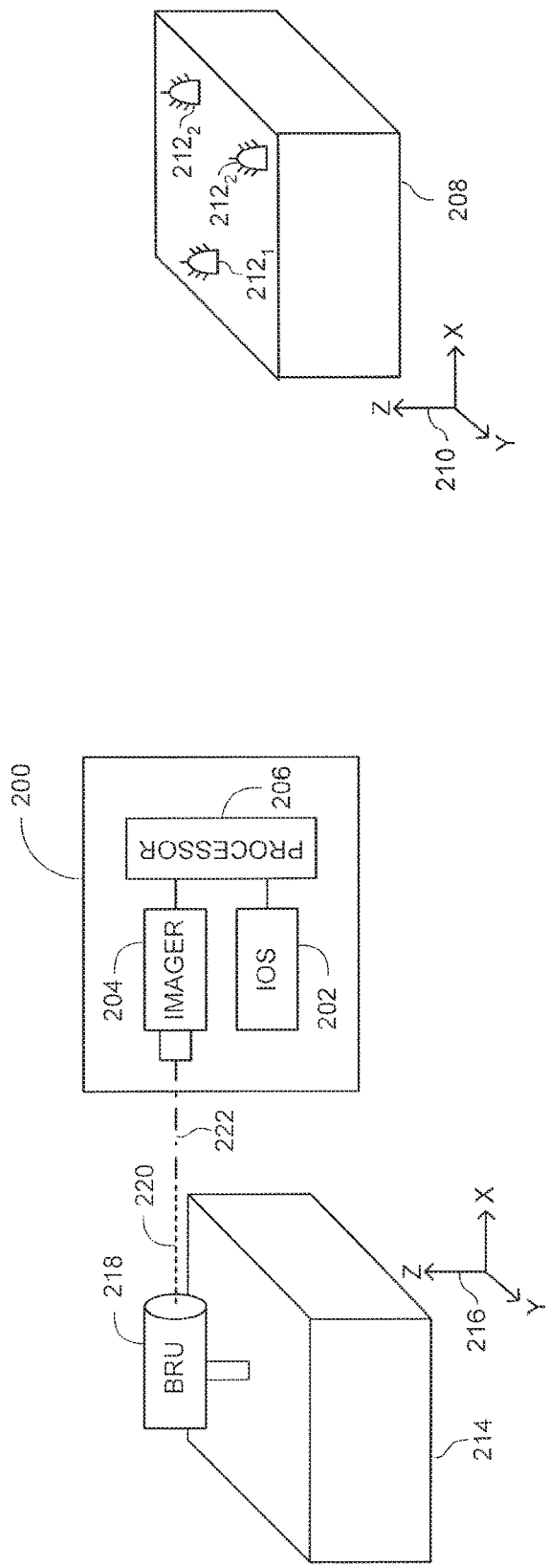
Figure 4C:
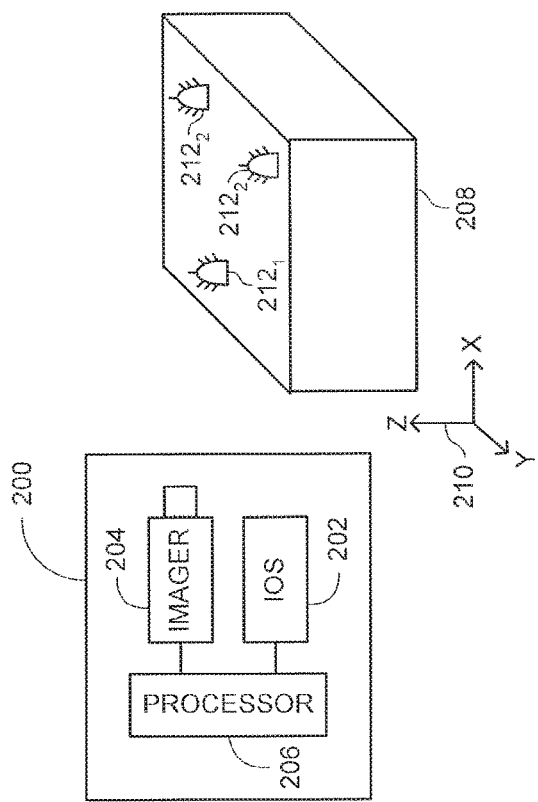
Figure 4C:
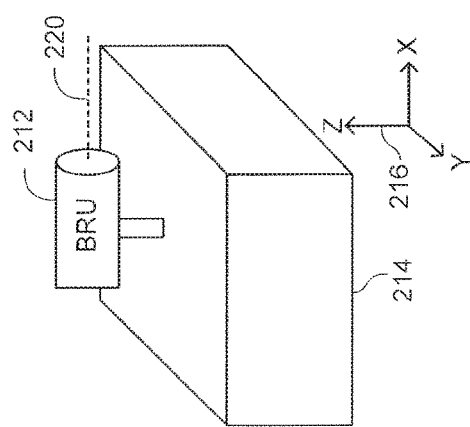

Reference is now made to FIGS. 4A-4C, which are schematic illustrations of a process for determining the relative orientation between two different locations, generally referenced 208 and 214, employing an orientation alignment device, generally referenced 200, in accordance with another embodiment of the disclosed technique. Orientation alignment device 200 is similar to device 100 of FIGS. 1A, 1B, 2A-2D and 3. Orientation alignment device 200 includes an inertial orientation sensor 202 (abbreviated IOS in FIGS. 4A-4C), an imager 204 and a processor 206. Processor 206 is coupled with inertial orientation sensor 202 and with imager 204. Inertial orientation sensor 202 and imager 204 are mechanically coupled therebetween such that inertial orientation sensor 202 and imager 204 maintain a fixed relative orientation therebetween. Inertial orientation sensor 202 may exhibit drift in the angular measurements thereof. Similar to Inertial orientation sensor 102 (FIGS. 1A, 1B, 2A-2D, 3), inertial orientation sensor 202 is, for example, a gyroscope (e.g., MEMS gyroscope, FOG, HRG, CVG, DTG or a London Moment Gyroscope), which measures the angular velocity of the device at three different orthogonal axes.

A first orientation indicator is located in first location 208, which in FIGS. 4A-4C is in the form of an array light emitters $212_1$, $212_2$ and $212_3$. The spatial relationship between light emitters $212_1$, $212_2$ and $212_3$ is known. This first location is associated with a respective first coordinate system 210. A second orientation indicator is located in second location 214, which in FIGS. 4A-4C is in the form of a BRU 218. This second location 214 is associated with a respective second coordinate system 216.

With reference to FIG. 4A, orientation alignment device 200 is oriented with light array emitters $212_1$, $212_2$ and $212_3$, located at first location 208. Imager 204 acquires an image or images of light emitters $212_1$, $212_2$ and $212_3$ and inertial orientation sensor 202 measures the orientation related information. Inertial orientation sensor 202 provides the measured orientation related information to processor 206. Processor 206 determines a first optical orientation of device 200 in first coordinate system 210 according to the at least one image of light emitters $212_1$, $212_2$ and $212_3$. Processor 206 further determines a first inertial orientation measurement according to the orientation related information provided by sensor 202 (i.e., as mentioned above either directly or by continuously integrating the output of inertial orientation sensor 202 over time) and time-tags this first inertial orientation measurement.

Thereafter, and with reference to FIG. 4B, orientation alignment device 200 is moved toward second location 214 and oriented with BRU 218. BRU 218 displays a collimated reticle (e.g., crosshairs). Similar to as explained above in conjunction with FIGS. 2A-2D, the reticle of BRU 218 is visible only when an observer exhibits a specific orientation and is located on the axis 220 of first BRU 218. Axis 220 of BRU 218 exhibits a predetermined orientation in second coordinate system 216. Orientation alignment device 200 is aligned with BRU 218. Specifically, device 200 is positioned such that BRU 218 is within the Field Of View (FOV) 222 of imager 204, imager 204 is located on axis 220 of BRU 218 and oriented such that the optical axis of imager 204 and the axis 220 of BRU 218 coincide. Consequently, imager 204, and thus device 200 exhibits a similar orientation to the orientation of axis 220 and thus of BRU 218. The reticle of BRU 218 is then visible in an imager acquired by Imager. Furthermore, inertial orientation sensor 202 measures the orientation related information. Inertial orientation sensor 202 provides measured orientation related information to processor 206. Processor 206 determines a second inertial orientation measurement of device 200 according to the orientation related information provided by inertial orientation sensor 202 and time-tags this second inertial orientation measurement.

Thereafter, with reference to FIG. 4C, orientation alignment device 200 is oriented again with array light emitters $212_1$, $212_2$ and $212_3$, located at first location 208. Imager 204 acquires another image or images of light emitters $212_1$, $212_2$ and $212_3$ and inertial orientation sensor 202 measures the orientation thereof a third time and provides this third orientation related information. Inertial orientation sensor 202 provides the measured orientation related information to processor 206. Processor 206 determines a second optical orientation of device 200 in first coordinate system 210, according to the at least one other image of light emitters $212_1$, $212_2$ and $212_3$. Processor 206 further determines a third inertial orientation measurement of device 200 according to the orientation related information provided by sensor 202 and time-tags this third inertial orientation measurement.

To determine the relative orientation between first coordinate system 210 and second coordinate system 216, processor 206 first determines the drift associated inertial orientation sensor 202 according to the difference between the first orientation measurement and the third orientation measurement and the respective time-tags associated with these first and third orientation measurements. More specifically, processor 206 divides the difference between the third orientation measurement and first orientation measurement by the difference between the time-tags associated there with as follows:

$$D = \frac{OM_3 - OM_1}{T_3 - T_1} \quad (1)$$

where D denotes the drift, $OM_1$ denotes the first orientation measurement, $OM_3$ denotes the third orientation measurement, $T_1$ denotes the time-tag associated with the first orientation measurement and $T_3$ denotes the time-tag associated with the third orientation measurement. It is note that D is a vector in which each entry in the vector relates to the drift value of the orientation measurement of a respective orientation axis (e.g., the drift associated with each of the pitch the yaw and the roll axes). It is noted that when the first orientation indicator is an array of light emitters such as light emitter $212_1$, $212_2$ and $212_3$, device 200 may not exhibit the exact same orientation when inertial orientation sensors acquires the orientation measurements the first time and the third time. Processor 206 compensates for this difference according to the difference between the second optical orientation and the first optical orientation as follows:

$$COM_3 = OM_3 + (OO_2 - OO_1) \quad (2)$$

where $COM_3$ denotes the third corrected orientation measurement, $OM_3$ denotes the third orientation measurement, $OO_1$ denotes the first optical orientation and $OO_2$ denotes the second optical orientation. Thus, when the first orientation indicator is an array of light emitters, $CMO_3$ should be employed in equation (1) instead of $OM_3$.

Once processor 206 determines the drift, D, processor 206 can determine the relative orientation between second coordinate system 216 and first coordinate system 210 according to the difference between the second orientation measurement and the first orientation measurement, the time-tags associated with the second orientation measurement and the first orientation measurement, and the determined drift. Accordingly, the processor determines the relative orientation between the two different locations as follows:

$$\Delta O = MO_2 - MO_1 - D \cdot (T_2 - T_1) \quad (3)$$

where $\Delta O$ is the relative the relative orientation between the two different locations, $MO_2$ is the second orientation measurement, $MO_1$ is the first orientation measurement, D is the drift $T_2$ is the time-tag associate with the second orientation measurement and $T_1$ is the time-tag associate with the first orientation measurement.

The above mentioned inertial orientation sensors (i.e., inertial orientation sensor 102 of FIGS. 1A, 1B, 2A-2D and inertial orientation sensor 202 of FIGS. 4A-4C) may include gyroscopic sensors which measure the angular velocity (i.e., the rate of change of the orientation) of the sensor. The orientation of the sensor (i.e., relative to an initial orientation) is obtained by integrating these measurements of the angular velocity in each axis. However, such gyroscopic sensors may exhibit a scaling error in the result of the integration. In other words, the result of the orientation measured by the inertial orientation sensor in each axis is scaled by a scaling factor relative to the actual orientation. To alleviate the scaling errors, a scaling factor has to be determined for each axis. To determine the scaling factor for each axis, the processor employs one of the first orientation indicators (i.e., either the first orientation indicator or the second orientation indicator). For example, when the orientation indicator is an array of light emitters, the imager in the orientation alignment device acquires at least two different images of the light emitters from two different locations and orientations. In other words, the orientation alignment device changes the position thereof as well as the orientation thereof between the acquisitions of the images. For each image, the processor determines a respective optical orientation according to the image and a respective inertial orientation according to the measurement of the inertial orientation sensor. For each orientation axis, the processor further determines an optical orientation difference and an inertial orientation difference between the determined orientations respective of each image. The ratio between the optical orientation difference and the respective inertial orientation difference for each orientation axis define the gyro-scale factor respective of that orientation axis. When either a mechanical orientation indicator or a BRU orientation indicator is employed, the orientation alignment device is aligned with the orientation indicator as explained above. The processor determines a respective first scaling inertial orientation according to the measurement of the inertial orientation sensor. Thereafter the device is rotated 360 degrees in each axis and re-aligned with the orientation indicator. The processor then determines a second scaling inertial orientation according to the measurement of the inertial orientation sensor. The ratio between the second inertial orientation and the first inertial orientation defines the gyro-scaling factor. Also, a plurality of such scaling factors may be accordingly determined and averaged.

Figure 5:
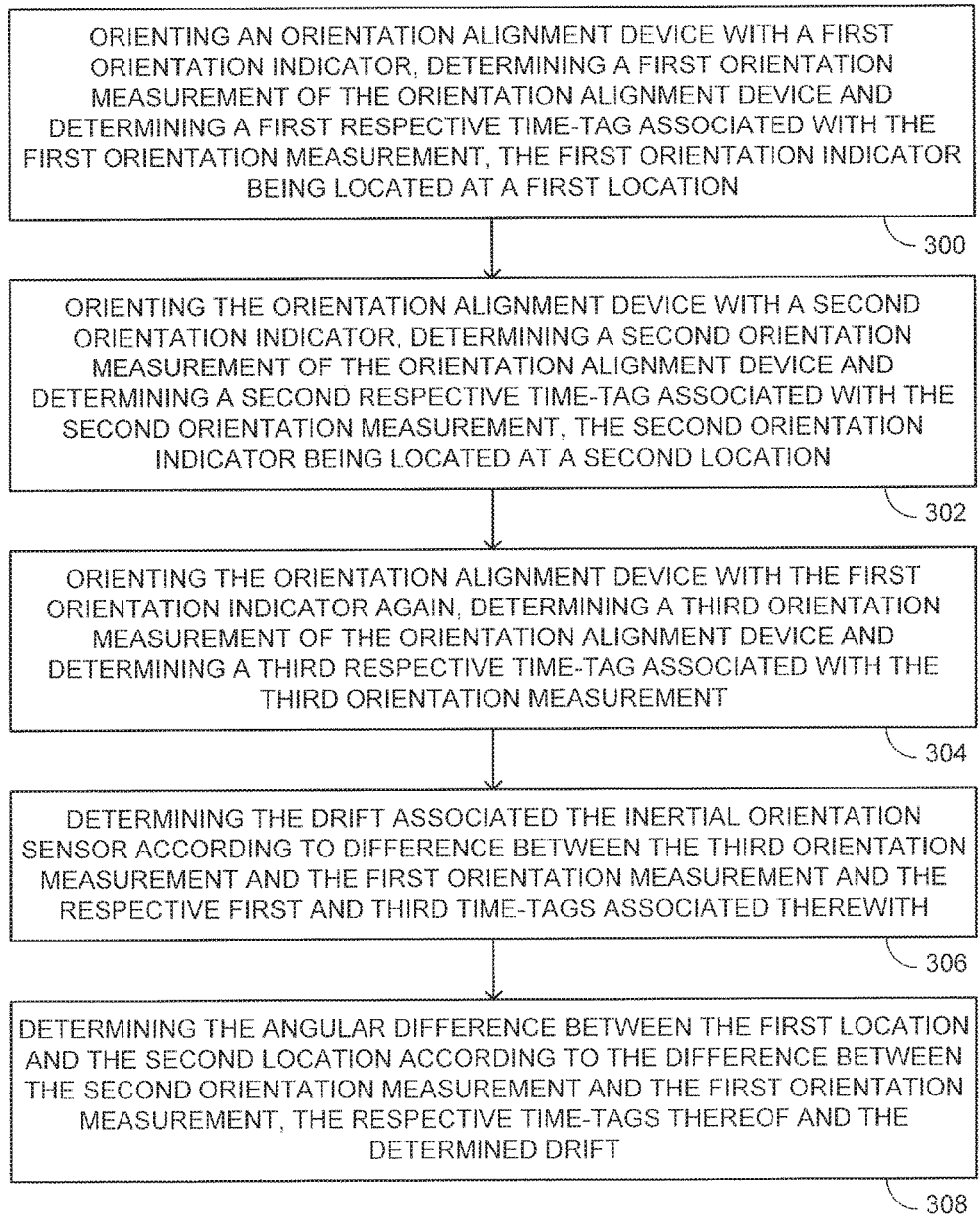
FIG. 5 is a schematic illustration of method for determining the relative orientation between two locations, operative in accordance with a further embodiment of the disclosed technique.

Reference is now made to FIG. 5, which is a schematic illustration of method for determining the relative orientation between two locations, operative in accordance with a further embodiment of the disclosed technique. In procedure 300, an orientation alignment device is oriented with a first orientation indicator, a first orientation measurement of the orientation alignment device is determined and a first respective time-tag, associated with the first orientation measurement is also determined. The first orientation indicator is located at a first location. This first location is associated with a respective first coordinate system. As described above, the first orientation indicator may be a mechanical orientation indicator, a BRU or an array of light emitters. With reference to FIG. 4A, orientation alignment device 200 is oriented with a first orientation indicator which is in the form of an array of light emitters $212_1$, $212_2$ and $212_3$. Inertial orientation sensor 202 measures orientation related information. Processor 206 determines a first orientation measurement of device 200 according to the orientation related information provided by sensor 202 and time-tags this first orientation measurement.

In procedure 302, the orientation alignment device is oriented with a second orientation indicator, a second orientation measurement of the orientation alignment device is determined and a second respective time-tag associated with the second orientation measurement is also determined. The second orientation indicator is located at a second location. This second location is associated with a respective second coordinate system. The second orientation indicator may also be a mechanical orientation indicator, a BRU or an array of light emitters. With reference to FIG. 4B, orientation alignment device 200 is oriented with a second orientation indicator which is in the form of a BRU 218. Inertial orientation sensor 202 measures orientation related information. Processor 206 determines a second orientation measurement of device 200 according to the orientation related information of sensor 202 and time-tags this second orientation measurement.

In procedure 304, the orientation alignment device is oriented again with the first orientation indicator, a third orientation measurement of the orientation alignment device is determined and a third respective time-tag associated with the third orientation measurement is also determined. With reference to FIG. 4C, orientation alignment device 200 is oriented again with a first orientation indicator which is in the form of an array of light emitters $212_1$, $212_2$ and $212_3$. Inertial orientation sensor 202 measures the orientation related information. Processor 206 determines a third orientation of device 200 according to the orientation related information of sensor 202 and time-tags this third orientation measurement.

In procedure 306, the drift associated the inertial orientation sensor is determined according to difference between the third orientation and the first orientation and the respective first and third time-tags associated therewith. With reference to FIGS. 4A-4C, processor 206 determines the drift associated the inertial orientation sensor.

In procedure 308, the angular difference between the first location and the second location is determined according to the difference between the second orientation measurement and the first orientation measurement, the first and second time-tags associated with the second orientation measurement and the first orientation measurement, and the determined drift. Thus, orientation of the first coordinate system is registered with the second coordinate system. With reference to FIGS. 4A-4C, processor 206 determines the angular difference between the first location and the second location.

When determining the relative orientation between two locations according to the disclosed technique, the measurements of the inertial orientations sensor (e.g., orientation alignment device 102—FIGS. 1A, 1B, 2A-2D and 3 or orientation alignment device 202—FIGS. 4A-4C) may be affected by the rotation of the earth. Consequently the orientation measurements may also be affected. The rotation of the earth introduces a drift (referred to herein as 'earth's drift') to the measurements of the inertial orientations sensor, which depends on the orientation thereof. Thus, the total drift associated with each orientation axis (i.e., the drift resulting from the inertial orientation sensor and the drift resulting from the rotation of the earth) is a function of the orientation of inertial orientation sensor.

Alleviating the effect of the rotation of the earth on the orientation measurements may be achieved by one of two methods or a combination of the two. According to the first method, during the transition between the first location (e.g., first location 208—FIGS. 4A-4C) and the second location (e.g., second location 214—FIGS. 4A-4C), the orientation alignment device (e.g., orientation alignment device 100—FIGS. 1A, 1B, 2A-2D and 3 or orientation alignment device 200—FIGS. 4A-4C) is held at a substantially constant orientation, similar to the orientation at the first location. The orientation alignment device is then oriented with the second orientation indicator for the duration of the second orientation measurement and thereafter re-oriented back to an orientation substantial similar to the orientation at the first location. The orientation alignment device is held substantially constant at this orientation during the transition from the second location back to the first location. Consequently, the effect of the rotation or the earth on the inertial orientation sensor is substantially similar on all axes of the inertial orientation sensor during the transitions between the first and the second locations. The total drift of the inertial orientation sensor remains substantially constant when determining the relative orientation between two locations. Furthermore, since the rotation of the earth is approximately $7.27*10^{-5}$ radians per second, orientating the orientation alignment device with the second orientation indicator during the second orientation measurement results in a substantially small error to the orientation measurement due to the earth's drift (i.e., up to $7.27*10^{-5}$ radians for every second of measurement duration).

According to the second method for alleviating the effects of the rotation of the earth on the inertial orientation sensor, the orientation of the first alignment device, as well as the latitude thereof, in a coordinate system associated with the earth (referred to herein 'an earth coordinate system'), are known. The errors introduced by the effects of the rotation of the earth may be iteratively alleviated. In other words, since drift resulting from the rotation of the earth is a function of the orientation of inertial orientation sensor and consequently of time, this function may be iteratively estimated and the error resulting from the earth's drift alleviated. It is noted that compensating the effects of the rotation of the earth as described herein above and below differs from the known in the art gyro-compassing technique in that there is no need for accurate accelerometers and gyroscopes nor is there a need for earth rotation compensation initialization, in which the system is held static for a determined period of time.

Figure 6:
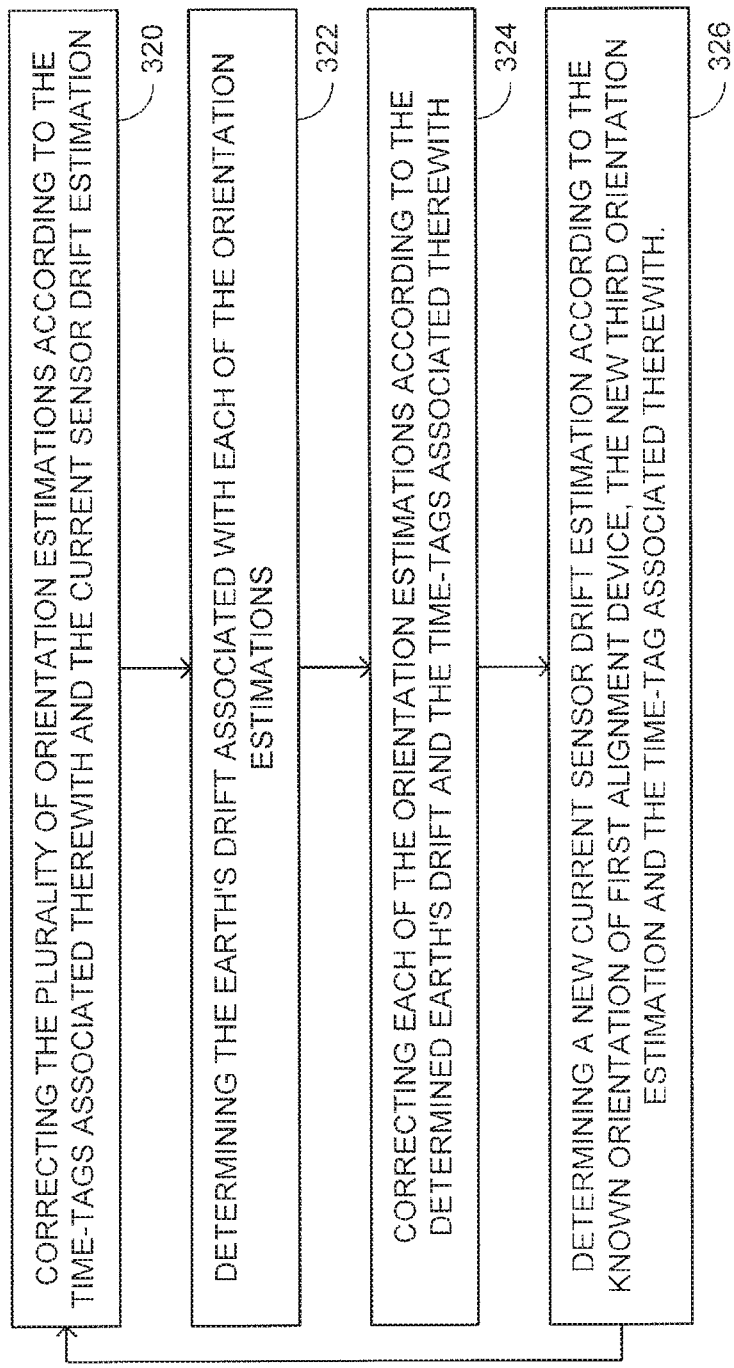
FIG. 6 is a schematic illustration of a method for alleviating the effects of the earth rotation on orientation measurements, operative in accordance with another embodiment of the disclosed technique.

Reference is now made to FIG. 6, which is a schematic illustration of a method for alleviating the effects of the earth rotation on orientation measurements, operative in accordance with another embodiment of the disclosed technique. In procedure 320, the plurality of orientation estimations are corrected according to the time-tags associated therewith and the current sensor drift estimation. Initially, the orientation estimations are a plurality of orientation measurements (i.e., orientation estimation samples) acquired during the transitions between the first and the second location a back to the first location as described above (i.e., the orientation trajectory in an orientation space). Also, initially, the current sensor drift estimation is the drift determined according to the orientation measurements as described above. It is noted that since the orientation of the first alignment device in an earth's coordinate system is known, all of the orientation measurements and estimations are determined in the earth's coordinate system. With reference to FIGS. 4A-4C, processor 206 corrects the plurality orientation estimations according to the time-tags associated therewith and the current sensor drift estimation.

In procedure 322, the earth's drift associated with each of the orientation estimations is determined (i.e., since, as mentioned above, the earth's drift is a function of the orientation of the inertial orientation sensor in the earth coordinate system). With reference to FIGS. 4A-4C, processor 206 determines the earth's drift for each of the orientation estimations.

In procedure 324, each of the orientation estimations is corrected according to the determined earth's drift and the time-tags associated therewith. For example, the earth's drift is integrated and the error introduced thereby to each orientation estimation sample is determined. Consequently, a new orientation estimation of the orientation alignment device, after the orientation alignment device is oriented with the first orientation indicator the second time, is also determined. The new orientation estimation of the orientation alignment device, after the orientation alignment device is oriented with the first orientation indicator the second time, is referred to herein as 'the new third orientation estimation'. With reference to FIGS. 4A-4C, processor 206 corrects each of the orientation estimations according to the determined earth's drift and the time-tags associated therewith.

In procedure 326, a new current sensor drift estimation is determined according to the known orientation of first alignment device, the new third orientation estimation and the time-tag associated therewith. It is noted that the time-tags associated with the orientation estimations are the time-tags associated with the corresponding orientation measurements. With reference to FIGS. 4A-4C, processor 206 a new sensor's drift estimation. After procedure 326 the method returns to procedure 320.

In general the number of iterations required to alleviate the effects of the earth's drift depends on the required margin of error as well as the duration of the transitions between the first location to the second location and back to the first location. For a given required margin of error, the number of iterations increases with the increasing transitions duration. For a given transitions duration, the number of iterations increases as the margin of error decreases.

Reference is now made to FIGS. 7A-7E which are schematic illustrations of various configurations of an orientation alignment device in accordance with the disclosed technique. FIG. 7A depicts an orientation alignment device, generally referenced 350, in accordance with a further embodiment of the disclosed technique. Device 350 includes an inertial orientation sensor 352, an imager 354 and a memory 356. Memory 356 is coupled with inertial angular rate sensor 352 and with imager 354. Inertial orientation sensor 352, imager 354 and memory 356 are all mechanically coupled therebetween, for example, via a rigid frame 358. Consequently, inertial orientation sensor 352 and imager 354 maintain a fixed relative orientation therebetween. Inertial orientation sensor 352 is similar to any of the above described inertial orientation sensors.

FIG. 7B depicts an orientation alignment device, generally referenced 360, in accordance with another embodiment of the disclosed technique. Device 360 includes an inertial orientation sensor 362, an imager 364 and a processor 366. Processor 366 is coupled with inertial angular rate sensor 362 and with imager 364. Inertial orientation sensor 362 and imager 364 are mechanically coupled therebetween, for example, via a rigid frame 368. Consequently, inertial orientation sensor 362 and imager 364 maintain a fixed relative orientation therebetween. However, processor 366 is not located on rigid frame 368. Inertial orientation sensor 362 is, for example, a gyroscope, which measures the angular velocity of device 360 at three different orthogonal axes (i.e., either one sensor measures the angular velocity in the three axes or three different sensors each measure the angular velocity in a respective different axis). Inertial orientation sensor 362 is similar to any of the above described inertial orientation sensors.

FIG. 7C depicts an orientation alignment device, generally referenced 370, in accordance with a further embodiment of the disclosed technique. Device 370 includes an inertial orientation sensor 372, an imager 374 and a memory 376. Memory 376 is coupled with inertial angular rate sensor 372 and with imager 374. Inertial orientation sensor 372 and imager 374 are mechanically coupled therebetween, for example, via a rigid frame 378. Consequently, inertial orientation sensor 372 and imager 374 maintain a fixed relative orientation therebetween. However, memory 376 is not located on rigid frame 378. Inertial orientation sensor 372 is similar to any of the above described inertial orientation sensors.

FIG. 7D depicts an orientation alignment device, generally referenced 380, in accordance with another embodiment of the disclosed technique. Device 380 includes an inertial orientation sensor 382, an imager 384, a transmitter 386, a receiver 388 and a processor 390. Transmitter 386 is coupled with inertial orientation sensor 382 and with imager 384. Processor 390 is coupled with receiver 388. Transmitter 386 and receiver 388 are wirelessly coupled therebetween. Thus, processor 386 is wirelessly coupled with inertial angular rate sensor 382 and with imager 384. Inertial orientation sensor 382 and imager 384 are mechanically coupled therebetween, for example, via a rigid frame 392. Consequently, inertial orientation sensor 382 and imager 384 maintain a fixed relative orientation therebetween. Processor 390 and receiver 388 are not located on rigid frame 392. Inertial orientation sensor 382 is similar to any of the above described inertial orientation sensors. Additionally, each one of transmitter 386 and receiver 388 may be embodied as a transceiver which can implement an acknowledged/not-acknowledged (ACK/NACK) protocol.

FIG. 7E depicts an orientation alignment device, generally referenced 400, in accordance with a further embodiment of the disclosed technique. Device 400 includes an inertial orientation sensor 402, an imager 404, a transmitter 406, a receiver 408 and a memory 410. Transmitter 406 is coupled with inertial orientation sensor 402 and with imager 404. Memory 410 is coupled with receiver 408. Transmitter 406 and receiver 408 are wirelessly coupled therebetween. Thus, memory 410 is wirelessly coupled with inertial angular rate sensor 402 and with imager 404. Inertial orientation sensor 402 and imager 404 are mechanically coupled therebetween, for example, via a rigid frame 412. Consequently, inertial orientation sensor 402 and imager 404 maintain a fixed relative orientation therebetween. Memory 410 and receiver 408 are not located on rigid frame 412. Inertial orientation sensor 402 is similar to any of the above described inertial orientation sensors. Additionally, each one of transmitter 406 and receiver 408 may be embodied as a transceiver.

The orientation alignment device described herein above may be employed independently for determining the relative orientation between two coordinates systems. The orientation alignment device described herein above may also be a part of a device with additional functionality. For example, a handle which also includes magnetic field detectors. Thus, the functionality of such a handle may be twofold, one for determining the relative orientation between two coordinate systems and the other is for mapping a magnetic field.

The invention claimed is:

1. A device for determining a relative orientation between two different locations, said device comprising:

an imager;

an inertial orientation sensor, firmly attached to said imager, for determining information relating to an orientation thereof, said inertial orientation sensor exhibiting drift; and a processor coupled with said imager and with said inertial orientation sensor, said processor configured to determine a first orientation measurement of said device according to the information related to the orientation of said inertial orientation sensor, when said device is oriented with a first orientation indicator and to determine a first time-tag associated with said first orientation measurement, said first orientation indicator being located at a first location, said processor further configured to determine a second orientation measurement of said device according to the information related to the orientation of said inertial orientation sensor, when said device is oriented with a second orientation indicator and to determine a second time-tag associated with said second orientation measurement, said second orientation indicator being located at a second location, said processor further configured to determine a third orientation measurement of said device according to the information related to the orientation of said inertial orientation sensor, when said device is oriented again with said first orientation indicator and to determine a third time-tag associated with said third orientation measurement, said processor further configured to determine the drift associated with said inertial orientation sensor according to difference between said first orientation measurement and said third orientation measurement and the respective time-tags associated with said first and third orientation measurements, said processor further configured to determine an angle difference between said first orientation indicator and said second orientation indicator according to said first orientation measurement and said second orientation measurement, said first and second time-tags and said drift.

2. The device according to claim 1, wherein each of said first orientation indicator and second orientation indicator is one of:
mechanical orientation indicator;
Boresight Registration Unit; and
at least three Light Emitting Diodes.

3. The device according to claim 2, wherein when one of said first orientation indicator and second orientation indicator is a mechanical orientation indicator, said device is oriented with said mechanical orientation indicator by attaching said device to said mechanical orientation indicator.

4. The device according to claim 2, wherein when one of said first orientation indicator and second orientation indicator is a Boresight Registration Unit, said device is oriented with said Boresight Registration Unit by aligning an optical axis of said imager with an optical axis of said Boresight Registration Unit while said Boresight Registration Unit is within the field of view of said imager.

5. The device according to claim 2, wherein when one of said first orientation indicator and second orientation indicator is at least three Light Emitting Diodes, said imager acquires at least one image of said at least three Light Emitting Diodes, and wherein said processor is further configured to determine the orientation of said device according to said at least one image.

6. The device according to claim 1, wherein said processor is further configured to determine scaling factors for said inertial orientation sensor employing one of said first orientation indicator and said second orientation indicator.

7. The device according to claim 6, wherein, when said one of said first orientation indicator and said second orientation indicator is at least three Light Emitting Diodes said imager acquires at least two different images of said at least three Light Emitting Diodes from two different locations and orientations, wherein for each image of said at least two different images, said processor is further configured to determine a respective optical orientation according to said image and a respective inertial orientation according to the information related to the orientation of said inertial orientation sensor, wherein for each orientation axis, said processor is further configured to determine an optical orientation difference and an inertial orientation difference between said determined optical and inertial orientation respective of each image of said at least two different images, and wherein said processor is further configured to determine a ratio between said optical orientation difference and said respective inertial orientation difference for each orientation axis, said ratio defining a scale factor respective of that orientation axis.

8. The device according to claim 6, wherein, when said one of said first orientation indicator and said second orientation indicator is one of a mechanical orientation indicator and a Boresight Registration Unit, said device is aligned with said one of said first orientation indicator and said second orientation indicator, wherein said processor is further configured to determine a respective first scaling inertial orientation according to the information related to the orientation of said inertial orientation sensor, wherein, said device is rotated 360 degrees in each axis and re-aligned with said one of said first orientation indicator and said second orientation indicator, wherein said processor is further configured to determine a second scaling inertial orientation according to the measurement of the inertial orientation sensor, and wherein said processor is further configured to determine a ratio between the second scaling inertial orientation and the first scaling inertial orientation for each orientation axis, the ratios defining a scale factor respective of said each orientation axis.

9. The device according to claim 1 further including a memory, at least coupled with said inertial orientation sensor, for storing at least said information relating to the orientation of said inertial orientation sensor.

10. The device according to claim 9, wherein said memory is further coupled with said imager, for storing images acquired by said imager.

11. The device according to claim 9, wherein said memory is further coupled with said processor.

12. The device according to claim 1, wherein said processor is further configured to wirelessly coupled with said imager and with said inertial orientation sensor.

13. The device according to claim 1, wherein said processor is further configured to iteratively alleviates the effects of the earth rotation on orientation measurements, wherein said processor is further configured to correct a plurality of orientation estimations acquired during the transitions between said first location and said second location and back to said first location, according to the time-tags associated with said plurality of orientation estimations and a current sensor drift estimation, wherein said processor is further configured to determine the earth's drift associated with each of said orientation estimations, wherein said processor is further configured to correct each of said orientation estimations according to said determined earth's drift and said time-tags associated therewith, and wherein said processor is further configured to determine a new current sensors drift estimation according to a known orientation of the device, a new third orientation estimation and said time-tag associated therewith.

14. A method for determining a relative orientation between two location, the method comprising the procedures of:

orienting an orientation alignment device with a first orientation indicator, said first orientation indicator being located at a first location, said orientation alignment device includes an inertial orientation sensor;

determining a first orientation measurement of said orientation alignment device according to the information related to an orientation of said inertial orientation sensor, and determining a time-tag associated with said first orientation measurement;

orienting said orientation alignment device with a second orientation indicator, said second orientation indicator being located at a second location;

determining a second orientation measurement of said orientation alignment device according to the information related to the orientation of said inertial orientation sensor, and determining a second respective time-tag associated with said second orientation measurement;

orienting said orientation alignment device with said first orientation indicator again;

determining a third orientation measurement of said orientation alignment device according to the information related to the orientation of said inertial orientation sensor, and determining a third time-tag associated with said third orientation measurement;

determining a drift associated with said inertial orientation sensor according to difference between said third orientation measurement and said first orientation measurement and the respective third and first time-tags associated therewith; and determining an angular difference between the first location and the second location according to said first orientation measurement, said second orientation measurement, said first and second time-tags and said drift.

15. The method according to claim 14, wherein each of said first orientation indicator and second orientation indicator is one of:

mechanical orientation indicator;
Boresight Registration Unit; and
at least three Light Emitting Diodes.

16. The method according to claim 15, further including a procedure of determining a scaling factor for said inertial orientation sensor employing one of said first orientation indicator and said second orientation indicator.

17. The method according to claim 16, wherein, when said one of said first orientation indicator and said second orientation indicator is at least three Light Emitting Diodes said procedure of determining a scaling factor includes the sub-procedures of:

acquiring at least two different images of said at least three Light Emitting Diodes from two different locations and orientations;

determining a respective optical orientation according to said at least two different images and a respective inertial orientation according to the information related to the orientation of said inertial orientation sensor;

for each orientation axis determining an optical orientation difference and an inertial orientation difference between said determined optical and inertial orientations respective of each image of said at least two different images; and determining a ratio between said optical orientation difference and said inertial orientation difference for each orientation axis, said ratio defining a scale factor respective of that orientation axis.

18. The method according to claim 16, wherein, when said one of said first orientation indicator and said second orientation indicator is one of a mechanical orientation indicator and a Boresight Registration Unit, said procedure of determining a scaling factor includes the sub-procedures of:

aligning said orientating alignment device with said one of said first orientation indicator and said second orientation indicator;

determining a respective first scaling inertial orientation according to the information related to the orientation of said inertial orientation sensor;

rotating said device 360 degrees in each axis and re-aligning with said one of said first orientation indicator and said second orientation indicator;

determining a second scaling inertial orientation according to the information related to the orientation of said inertial orientation sensor; and determining a ratio between the second scaling inertial orientation and the first scaling inertial orientation for each orientation axis, the ratios defining a scale factor respective of said each orientation axis.

19. The method according to claim 14, further includes the procedure of alleviating the effects of the earth rotation on orientation measurements including the sub-procedures of:

correcting a plurality of orientation estimations acquired during the transitions between said first location and said second location and back to said first location, according to the time-tags associated with said plurality of orientation estimations and a current sensor drift estimation;

determining the earth's drift associated with each of said orientation estimations;

correcting each of said orientation estimations according to said determined earth's drift and said time-tags associated therewith;

determining a new current sensors drift estimation according to a known orientation of first alignment device, a new third orientation estimation and said time tag associated therewith; and repeating from said sub-procedure of correcting a plurality of orientation estimations.

* * * * *